(12) United States Patent
Obradovich et al.

(10) Patent No.: US 7,650,234 B2
(45) Date of Patent: Jan. 19, 2010

(54) TECHNIQUE FOR EFFECTIVE NAVIGATION BASED ON USER PREFERENCES

(75) Inventors: Michael L. Obradovich, San Clemente, CA (US); John D. Pirtle, Silverado, CA (US); Steven W. Schebesch, Aliso Viejo, CA (US)

(73) Assignee: American Calcar Inc., Las Vegas, NV (US)

(*) Notice: Subject to any disclaimer, the term of this patent is extended or adjusted under 35 U.S.C. 154(b) by 2 days.

(21) Appl. No.: 11/971,193

(22) Filed: Jan. 8, 2008

(65) Prior Publication Data

US 2008/0120024 A1 May 22, 2008

Related U.S. Application Data

(63) Continuation of application No. 11/146,599, filed on Jun. 7, 2005, now Pat. No. 7,522,992, which is a continuation of application No. 10/957,042, filed on Oct. 1, 2004, now Pat. No. 6,993,429, which is a continuation of application No. 10/382,687, filed on Mar. 6, 2003, now Pat. No. 6,829,532, which is a continuation of application No. 09/830,064, filed as application No. PCT/US00/27270 on Oct. 4, 2000, now Pat. No. 6,542,812.

(60) Provisional application No. 60/160,326, filed on Oct. 19, 1999.

(51) Int. Cl.
  *G01C 21/34* (2006.01)
(52) U.S. Cl. .......................................... 701/207; 701/25
(58) Field of Classification Search ......... 701/200–202, 701/117–119, 207–209, 25; 340/988, 989
See application file for complete search history.

(56) References Cited

U.S. PATENT DOCUMENTS 4,207,609 A   6/1980 Luiz et al.

(Continued)

FOREIGN PATENT DOCUMENTS

EP   0 829 704 A2   3/1998

(Continued)

OTHER PUBLICATIONS

Eleftheriadis, et al. "User Profile Identification In Future Mobile Telecommunications Systems", IEEE Network, IEEE Inc. New York, U.S. vol. 8, No. 5, Sep./Oct. 1994 (p. 33-39).

(Continued)

*Primary Examiner*—Yonel Beaulieu
(74) *Attorney, Agent, or Firm*—Klein, O'Neill & Singh, LLP (57) ABSTRACT

A navigation device utilizes stored user profiles to navigate a user who may be driving in a vehicle, on foot, or in other mode of transportation. Each user profile corresponds to one of the user's personae. For example the user business profile corresponding to the user's business persona may be different from the user personal profile corresponding to the user's personal persona. The navigation device provides the user with a navigated route, together with information concerning the favorite facilities and events surrounding the navigated route, which satisfy the preferences in a selected user profile. Blockages may also be established using the device to avoid selected areas, or to block transmission of selected information.

30 Claims, 8 Drawing Sheets

U.S. PATENT DOCUMENTS

| | | |
|---|---|---|
| 4,350,970 A | 9/1982 | von Tomkewitsch |
| 4,521,857 A | 6/1985 | Reynolds, III |
| 4,792,803 A | 12/1988 | Madnick et al. |
| 4,812,843 A | 3/1989 | Champion, III et al. |
| 4,977,509 A | 12/1990 | Pitchford et al. |
| 5,023,934 A | 6/1991 | Wheeless |
| 5,043,736 A | 8/1991 | Darnell et al. |
| 5,075,693 A | 12/1991 | McMillan et al. |
| 5,119,504 A | 6/1992 | Durboraw, III |
| 5,124,915 A | 6/1992 | Krenzel |
| 5,127,674 A | 7/1992 | Lamphere et al. |
| 5,157,614 A | 10/1992 | Kashiwazaki et al. |
| 5,164,904 A | 11/1992 | Sumner |
| 5,189,632 A | 2/1993 | Paajanen et al. |
| 5,225,843 A | 7/1993 | Thompson |
| 5,235,633 A | 8/1993 | Dennison et al. |
| 5,265,024 A | 11/1993 | Crabill et al. |
| 5,267,042 A | 11/1993 | Tsuchiya et al. |
| 5,272,638 A | 12/1993 | Martin et al. |
| 5,295,064 A | 3/1994 | Malec et al. |
| 5,299,132 A | 3/1994 | Wortham |
| 5,334,974 A | 8/1994 | Simms et al. |
| 5,335,276 A | 8/1994 | Thompson et al. |
| 5,406,493 A | 4/1995 | Goto et al. |
| 5,412,573 A | 5/1995 | Barnea et al. |
| 5,420,592 A | 5/1995 | Johnson |
| 5,432,841 A | 7/1995 | Rimer |
| 5,450,329 A | 9/1995 | Tanner |
| 5,479,351 A | 12/1995 | Woo et al. |
| 5,479,482 A | 12/1995 | Grimes |
| 5,497,339 A | 3/1996 | Bernard |
| 5,504,482 A | 4/1996 | Schreder |
| 5,504,684 A | 4/1996 | Lau et al. |
| 5,517,193 A | 5/1996 | Allison et al. |
| 5,519,403 A | 5/1996 | Bickley et al. |
| 5,523,950 A | 6/1996 | Peterson |
| 5,528,248 A | 6/1996 | Steiner et al. |
| 5,528,493 A | 6/1996 | Potter |
| 5,539,645 A | 7/1996 | Mandhyan et al. |
| 5,543,789 A | 8/1996 | Behr et al. |
| 5,544,061 A | 8/1996 | Morimoto et al. |
| 5,555,286 A | 9/1996 | Tendler |
| 5,559,520 A | 9/1996 | Barzegar et al. |
| 5,559,707 A | 9/1996 | DeLorme et al. |
| 5,572,204 A | 11/1996 | Timm et al. |
| 5,579,535 A | 11/1996 | Orlen et al. |
| 5,600,796 A | 2/1997 | Okamura et al. |
| 5,604,676 A | 2/1997 | Penzias |
| 5,625,668 A | 4/1997 | Loomis et al. |
| 5,625,884 A | 4/1997 | Gitlin et al. |
| 5,627,547 A | 5/1997 | Ramaswamy et al. |
| 5,627,549 A | 5/1997 | Park |
| 5,630,068 A | 5/1997 | Vela et al. |
| 5,638,279 A | 6/1997 | Kishi et al. |
| 5,640,156 A | 6/1997 | Okuda et al. |
| 5,642,285 A | 6/1997 | Woo et al. |
| 5,648,763 A | 7/1997 | Long |
| 5,648,769 A | 7/1997 | Sato et al. |
| 5,652,379 A | 7/1997 | Fukatani |
| 5,654,886 A | 8/1997 | Zereski, Jr. et al. |
| 5,661,652 A | 8/1997 | Sprague et al. |
| 5,663,548 A | 9/1997 | Hayashi et al. |
| 5,673,039 A | 9/1997 | Pietzsch et al. |
| 5,675,732 A | 10/1997 | Majeti et al. |
| 5,677,837 A | 10/1997 | Reynolds |
| 5,680,444 A | 10/1997 | Reeves |
| 5,689,252 A | 11/1997 | Ayanoglu et al. |
| 5,694,514 A | 12/1997 | Evans et al. |
| 5,699,056 A | 12/1997 | Yoshida |
| 5,699,255 A | 12/1997 | Ellis et al. |
| 5,717,748 A | 2/1998 | Sneed, Jr. et al. |
| 5,717,749 A | 2/1998 | Sneed, Jr. et al. |
| 5,719,936 A | 2/1998 | Hillenmayer |
| 5,720,037 A | 2/1998 | Biliris et al. |
| 5,724,316 A | 3/1998 | Brunts |
| 5,727,053 A | 3/1998 | Sizer, II et al. |
| 5,731,997 A | 3/1998 | Manson et al. |
| 5,742,509 A | 4/1998 | Goldberg et al. |
| 5,745,855 A | 4/1998 | Futamura |
| 5,748,106 A | 5/1998 | Schoenian et al. |
| 5,754,938 A | 5/1998 | Herz et al. |
| 5,760,742 A | 6/1998 | Branch et al. |
| 5,774,070 A | 6/1998 | Rendon |
| 5,774,825 A | 6/1998 | Reynolds |
| 5,774,827 A | 6/1998 | Smith, Jr. et al. |
| 5,781,150 A | 7/1998 | Norris |
| 5,786,789 A | 7/1998 | Janky |
| 5,790,974 A | 8/1998 | Tognazzini |
| 5,794,174 A | 8/1998 | Janky et al. |
| 5,802,492 A | 9/1998 | DeLorme et al. |
| 5,809,247 A | 9/1998 | Richardson et al. |
| 5,815,683 A | 9/1998 | Vogler |
| 5,819,227 A | 10/1998 | Obuchi |
| 5,852,810 A | 12/1998 | Sotiroff et al. |
| 5,864,305 A | 1/1999 | Rosenquist |
| 5,908,464 A | 6/1999 | Kishigami et al. |
| 5,917,405 A | 6/1999 | Joao |
| 5,919,246 A | 7/1999 | Waizmann et al. |
| 5,926,118 A | 7/1999 | Hayashida et al. |
| 5,929,774 A | 7/1999 | Charlton |
| 5,938,721 A | 8/1999 | Dussell et al. |
| 5,946,626 A | 8/1999 | Foladare et al. |
| 5,948,040 A | 9/1999 | DeLorme et al. |
| 5,950,173 A | 9/1999 | Perkowski |
| 5,963,956 A | 10/1999 | Smartt |
| 5,982,298 A | 11/1999 | Lappenbusch et al. |
| 5,999,124 A | 12/1999 | Sheynblat |
| 5,999,877 A | 12/1999 | Takahashi et al. |
| 6,021,371 A | 2/2000 | Fultz |
| 6,028,550 A | 2/2000 | Froeberg et al. |
| 6,035,253 A | 3/2000 | Hayashi et al. |
| 6,040,824 A | 3/2000 | Maekawa et al. |
| 6,041,311 A | 3/2000 | Chislenko et al. |
| 6,047,327 A | 4/2000 | Tso et al. |
| 6,073,075 A | 6/2000 | Kondou et al. |
| 6,075,874 A | 6/2000 | Higashikubo et al. |
| 6,087,965 A | 7/2000 | Murphy |
| 6,091,956 A | 7/2000 | Hollenberg |
| 6,092,076 A | 7/2000 | McDonough et al. |
| 6,107,939 A | 8/2000 | Sorden |
| 6,107,944 A | 8/2000 | Behr et al. |
| 6,119,066 A | 9/2000 | Sugiura et al. |
| 6,122,506 A | 9/2000 | Lau et al. |
| 6,124,825 A | 9/2000 | Eschenbach |
| 6,127,945 A | 10/2000 | Mura-Smith |
| 6,128,624 A | 10/2000 | Papierniak |
| 6,131,066 A | 10/2000 | Ahrens et al. |
| 6,131,067 A | 10/2000 | Girerd et al. |
| 6,133,853 A | 10/2000 | Obradovich et al. |
| 6,134,501 A | 10/2000 | Oumi |
| 6,141,610 A | 10/2000 | Rothert et al. |
| 6,144,920 A | 11/2000 | Mikame |
| 6,147,598 A | 11/2000 | Murphy et al. |
| 6,148,261 A | 11/2000 | Obradovich et al. |
| 6,154,745 A | 11/2000 | Kari et al. |
| 6,163,749 A | 12/2000 | McDonough et al. |
| 6,163,753 A | 12/2000 | Beckmann et al. |
| 6,166,626 A | 12/2000 | Janky et al. |
| 6,169,955 B1 | 1/2001 | Fultz |
| 6,173,231 B1 | 1/2001 | Chojnacki |
| 6,182,067 B1 | 1/2001 | Presnell et al. |
| 6,184,801 B1 | 2/2001 | Janky |
| 6,185,427 B1 | 2/2001 | Krasner et al. |
| 6,188,957 B1 | 2/2001 | Bechtolsheim et al. |

| | | | |
|---|---|---|---|
| 6,192,312 B1 | 2/2001 | Hummelsheim |
| 6,192,314 B1 | 2/2001 | Khavakh et al. |
| 6,199,013 B1 | 3/2001 | O'Shea |
| 6,202,023 B1 | 3/2001 | Hancock et al. |
| 6,208,934 B1 | 3/2001 | Bechtolsheim et al. |
| 6,212,392 B1 | 4/2001 | Fitch et al. |
| 6,212,470 B1 | 4/2001 | Seymour et al. |
| 6,212,472 B1 | 4/2001 | Nonaka et al. |
| 6,212,473 B1 | 4/2001 | Stefan et al. |
| 6,212,550 B1 | 4/2001 | Segur |
| 6,215,857 B1 | 4/2001 | Kasiviswanathan |
| 6,215,993 B1 | 4/2001 | Ulveland |
| 6,219,557 B1 | 4/2001 | Havinis |
| 6,219,614 B1 | 4/2001 | Uchigaki et al. |
| 6,219,694 B1 | 4/2001 | Lazaridis et al. |
| 6,266,614 B1 | 7/2001 | Alumbaugh |
| 6,292,743 B1 | 9/2001 | Pu et al. |
| 6,321,158 B1 | 11/2001 | DeLorme et al. |
| 6,321,160 B1 | 11/2001 | Takahashi |
| 6,332,127 B1 | 12/2001 | Bandera et al. |
| 6,334,087 B1 | 12/2001 | Nakano et al. |
| 6,339,744 B1 | 1/2002 | Hancock et al. |
| 6,374,237 B1 | 4/2002 | Reese |
| 6,421,675 B1 | 7/2002 | Ryan et al. |
| 6,427,121 B2 | 7/2002 | Brodie |
| 6,466,862 B1 | 10/2002 | DeKock et al. |
| 6,515,595 B1 | 2/2003 | Obradovich et al. |
| 6,529,143 B2 | 3/2003 | Mikkola et al. |
| 6,529,824 B1 | 3/2003 | Obradovich et al. |
| 6,542,812 B1 | 4/2003 | Obradovich et al. |
| 6,546,002 B1 | 4/2003 | Kim |
| 6,574,734 B1 | 6/2003 | Colson et al. |
| 6,639,550 B2 | 10/2003 | Knockeart et al. |
| 6,680,694 B1 | 1/2004 | Knockeart et al. |
| 6,707,421 B1 | 3/2004 | Drury et al. |
| 6,745,188 B2 | 6/2004 | Bradburn |
| 6,924,748 B2 | 8/2005 | Obradovich et al. |
| 6,954,735 B1 | 10/2005 | Djupsjobacka et al. |
| 7,236,100 B2 | 6/2007 | Obradovich et al. |

FOREIGN PATENT DOCUMENTS

| | | |
|---|---|---|
| EP | 0 853 287 A2 | 7/1998 |
| JP | 9-231263 | 5/1997 |
| WO | WO 97/07467 | 2/1997 |
| WO | WO 99/33293 | 7/1999 |

OTHER PUBLICATIONS

European Search Report dated Jun. 23, 2005 for European Patent Application No. EP 05 00 4271.2-2201, filed Mar. 2, 2005, European Search Report mailed Jul. 5, 2005 (5 pgs.).
American Calcar Inc. "Summons to Attend Oral Proceedings Pursuant to Rule 71(1) EPC" and "Annex To Summons To Oral Proceedings" issued on Dec. 22, 2004 in connection with European Patent Application No. 00972367.7-2201, filed Oct. 27, 2000 (5 pgs.).
American Calcar Inc. "Communication Pursuant to Article 96(2) EPC" issued on Aug. 1, 2003 in connection with European Patent Application No. 0972367.7-2001, filed Oct. 27, 2000 (7 pgs.).
PCT Written Opinion for International Application No. PCT/US00/29520, filed Oct. 27, 2000, Written Opinion dated Aug. 28, 2001.
Supplemental Search Report for European Patent Application No. 00972367.7, dated Jan. 9, 2003 and mailed Jan. 21, 2003 (4 pgs.).
Office Action for U.S. Appl. No. 09/699,031, filed Oct. 27, 2000, inventor Michael L. Obradovich, Office Action mailed Dec. 20, 2002 (31 pgs.).
Final Office Action for U.S. Appl. No. 09/699,031, filed Oct. 27, 2000, inventor Michael L. Obradovich, Final Office Action mailed Jul. 17, 2003 (14 pgs.).
Advisory Action for U.S. Appl. No. 09/699,031, filed Oct. 27, 2000, inventor Michael L. Obradovich, Advisory Action mailed Oct. 20, 2003 (3 pgs.).
Office Action for U.S. Appl. No. 09/699,031, filed Oct. 27, 2000, inventor Michael L. Obradovich, Office Action mailed Dec. 29, 2003 (10 pgs.).
Final Office Action for U.S. Appl. No. 09/699,031, filed Oct. 27, 2000, inventor Michael L. Obradovich, Final Office Action mailed Jun. 22, 2004 (14 pgs.).
Office Action for U.S. Appl. No. 09/699,031, filed Oct. 27, 2000, inventor Michael L. Obradovich, Office Action mailed Dec. 22, 2004 (13 pgs.).
Final Office Action for U.S. Appl. No. 09/699,031, filed Oct. 27, 2000, inventor Michael L. Obradovich, Final Office Action mailed Jun. 16, 2005 (11 pgs.).
Office Communication entitled "Notice of Panel Decision from Pre-Appeal Brief Review" for U.S. Appl. No. 09/699,031, filed Oct. 27, 2000, inventor Michael L. Obradovich, Office Communication mailed Jan. 12, 2006 (2 pgs.).
Final Office Action for U.S. Appl. No. 09/699,031, filed Oct. 27, 2000, inventor Michael L. Obradovich, Final Office Action mailed Mar. 21, 2006 (12 pgs.).
Application as Filed Oct. 27, 2000 for "System and Method for User Navigation", inventor Michael L. Obradovich, Application No. 09/699,031 (specification 16 pgs.; claims 4 pgs.; abstract, drawings (16 pgs.).
Amendment for U.S. Appl. No. 09/699,031, filed Oct. 27, 2000, inventor Michael L. Obradovich, Amendment mailed Apr. 21, 2003 (10 pgs.).
Response to Final Action for U.S. Appl. No. 09/699,031, filed Oct. 27, 2000, inventor Michael L. Obradovich, Response mailed Sep. 17, 2003 (6 pgs.).
Amendment with an RCE for U.S. Appl. No. 09/699,031, filed Oct. 27, 2000, inventor Michael L. Obradovich, Amendment mailed Nov. 20, 2003 (9 pgs.).
Amendment for U.S. Appl. No. 09/699,031, filed Oct. 27, 2000, inventor Michael L. Obradovich, Amendment mailed Mar. 29, 2004 (15 pgs.).
Amendment for U.S. Appl. No. 09/699,031, filed Oct. 27, 2000, inventor Michael L. Obradovich, Amendment mailed Sep. 22, 2004 (10 pgs.).
Amendment for U.S. Appl. No. 09/699,031, filed Oct. 27, 2000, inventor Michael L. Obradovich, Amendment mailed Mar. 22, 2005 (11 pgs.).
Notice of Appeal, with Pre-Appeal Brief Request and Arguments Accompanying Pre-Appeal Brief Request For Review, for U.S. Appl. No. 09/699,031, filed Oct. 27, 2000, inventor Michael L. Obradovich, Appeal papers mailed Nov. 16, 2005 (7 pgs. total).

| | |
|---|---|
| 503 | PERSONAL DATA |
| 505 | BUSINESS PROFILE |
| 507 | PERSONAL PROFILE |
| 509 | VACATION PROFILE |
| 511 | GPS DATA |
| 513 | MAP AND RELATED INFORMATION |
| 515 | BUSINESS FAVORITES |
| 517 | PERSONAL FAVORITES |
| 519 | VACATION FAVORITES |

TECHNIQUE FOR EFFECTIVE NAVIGATION BASED ON USER PREFERENCES

This application is a continuation of application Ser. No. 11/146,599 filed on Jun. 7, 2005 now U.S. Pat. No. 7,522,992, the disclosure of which is incorporated by reference herein, which is a continuation of application Ser. No. 10/957,042 filed on Oct. 1, 2004, now U.S. Pat. No. 6,993,429, which is a continuation of application Ser. No. 10/382,687 filed on Mar. 6, 2003, now U.S. Pat. No. 6,829,532, which is a continuation of application Ser. No. 09/830,064 filed on Apr. 20, 2001, now U.S. Pat. No. 6,542,812, which is a National Stage of International Application No. PCT/US00/27270 filed on Oct. 4, 2000, which was published under PCT Article 12 (2) in English and which claims the priority of Provisional Application No. 60/160,326 filed on Oct. 19, 1999.

FIELD OF THE INVENTION

The invention relates to a navigation technique, and more particularly to a technique for navigation subject to user preferences.

BACKGROUND OF THE INVENTION

Recently, navigation systems based on global positioning system (GPS) technology were developed for use in an automobile. Such navigation systems are capable of receiving signals from a constellation of satellites which is part of the GPS. Based on the received signals, one such navigation system identifies the automobile's location, e.g., in latitude and longitude. The navigation system also detects the automobile's speed and direction. With geographic information stored in an on-board computer in the automobile, the navigation system is capable of audio-visually communicating to a user instructions for reaching a given destination.

Similarly, a GPS navigation device in hand-held form enables a user carrying the device to monitor his/her planned route leading to a given destination. Nowadays, in general, hand-held devices for information organization and communications are popular and have been proliferating. For example, use of cellular phones for communications is ubiquitous. Use of personal data assistants (PDAs), e.g., PALM type hand-held devices, is equally ubiquitous for organizing personal information including meeting schedules, telephone listing, address information, etc. More recently, hand-held communicators emerged which have cellular communication and modem facilities integrated into a PDA, thereby enabling a user to communicate data in a wireless manner, e.g., to send and receive email, and to upload and download information from websites via the Internet.

SUMMARY OF THE INVENTION

Traditionally, a navigation device, e.g., a GPS navigation system used in an automobile, provides a user with directions to a given destination. The navigation typically provides the shortest navigated route in terms of distance to the given destination. However, we have expanded the concept of the traditional navigation to broadly include providing a navigated route subject to user preferences, together with information concerning facilities and events surrounding the navigated route for the user's convenience. The navigated route is selected to satisfy a trip's purpose. Such a trip's purpose may be (1) to reach a given destination as in prior art, and/or (2) to perform certain tasks enroute or at the destination, which may include purchasing business supplies, shopping for gifts, dining, obtaining entertainments, etc. To realize (2), the navigator arrangement in accordance with the invention allows for storage of user profiles including user preferences such as preferred types of restaurants, shops, entertainments, etc.

In accordance with an aspect of the invention, each user profile corresponds to one of the user's personae. For example, the user business profile corresponding to the user's business persona may be different from the user personal profile corresponding to his/her personal persona. For instance, the user business profile may include fine-dining type restaurants for business meetings while the user personal profile may instead include fast-food type restaurants for personal dining. Thus, the navigator arrangement in accordance with the invention provides a navigated route, together with information concerning the favorite facilities and events surrounding the navigated route, which satisfy the preferences in a selected user profile.

In accordance with another aspect of the invention, the user can adopt a second person's profile for a trip's purpose particular to that second person, thereby temporarily assuming the second person's persona to achieve such a trip's purpose.

In accordance with yet another aspect of the invention, the actual navigated route selected by the inventive navigator arrangement may depend on the mode of transportation specified by the user. For example, driving and walking are two different modes of transportation. The selected route for driving may be very different from that for walking, even though they may accomplish the same trip's purpose. The routes from which the inventive navigator arrangement selects for driving have to be passable by an automobile, which exclude, e.g., foot bridges, and walk paths through buildings, parks, fields, forests, etc. On the other hand, the routes from which the inventive navigator arrangement selects for walking have to be safe to pedestrians, which exclude, e.g., highways, freeways, etc.

In accordance with still yet another aspect of the invention, the actual route selected by the inventive navigator arrangement may also depend on external conditions, e.g., traffic, weather and road conditions. Thus, based on the information concerning such external conditions received from, say, a server via the Internet, the inventive navigator arrangement selects the most time-efficient route, e.g., one that requires the least travel time, to accomplish the trip's purpose despite any adverse traffic, weather and road conditions.

In accordance with a further aspect of the invention, a user may prescribe one or more roadblocks specifying certain prohibited areas or paths from which the route selected by the inventive navigator arrangement deviates. For example, it may be sensible to place roadblocks around high crime areas especially when the user is new in town and unfamiliar with those areas. A roadblock may be permanent or temporary. For example, a temporary roadblock may be placed on certain streets where a parade is held which lasts for several hours. Similar to a roadblock, a blockade may be imposed to block transmission of certain information to the inventive navigator arrangement which concerns, e.g., uninteresting facilities or events.

BRIEF DESCRIPTION OF THE DRAWING

Further aspects, features and advantages of the invention will become apparent from the following detailed description taken in conjunction with the accompanying drawing showing an illustrative embodiment of the invention, in which.

DETAILED DESCRIPTION

Figure 1:
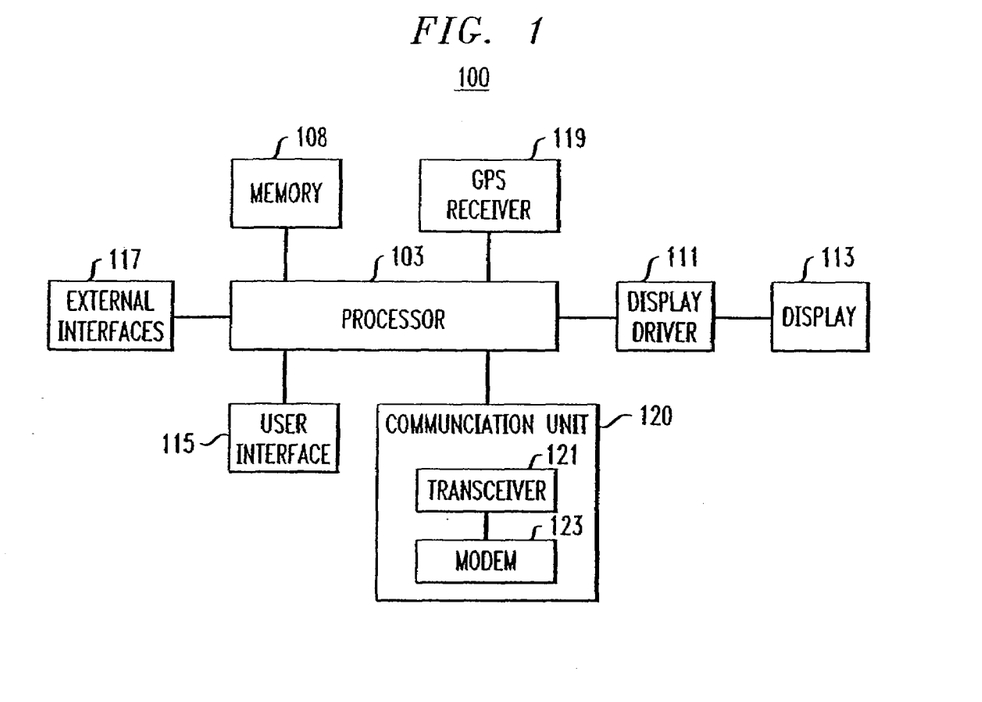
FIG. 1 is a block diagram of a navigator arrangement in accordance with the invention.

FIG. 1 illustrates navigator arrangement 100 embodying the principles of the invention for navigation subject to user preferences. Navigator arrangement 100 in this instance is realized as a hand-held device, which may be "docked" or connected to another device or system to enhance its functionality, which may include a terminal, workstation, computer system, or an automobile system described, e.g., in U.S. Pat. No. 6,009,355 issued to Obradovich et al. on Dec. 28, 1999.

As shown in FIG. 1, navigator arrangement 100 includes processor 103, memory 108, display driver 111, display 113, user interface 115, external interfaces 117, GPS receiver 119, communication unit 120. Memory 108 is used to store software and data for processor 103 to carry out various operations of arrangement 100. In this instance, the stored software includes a navigator browser similar to the well known NETSCAPE NAVIGATOR or MICROSOFT INTERNET EXPLORER web browser for browsing information provided, e.g., by servers connected to the Internet. In particular, the navigator browser works compatibly with the standard hypertext transfer protocol (HTTP), hypertext markup language (HTML), virtual reality markup language (VRML), graphics interchange format (GIF), JAVA applets, etc.

Display 113 may include a conventional liquid crystal display (LCD). Through display driver 111, processor 103 controls the display of text and graphics on display 113 in a predetermined format. User interface 115 may comprise conventional audio circuitry including a microphone and speaker for the user to communicate with arrangement 100 via audio media. User interface 115 may also comprise an indicator device, e.g., a mouse, touchpad, roller ball, or a combination thereof, which enables a user to move a cursor on display 113 and to, e.g., point and click at a displayed option or an icon to select same. In addition, interface 115 may incorporate well-known touch-screen circuitry (not shown). With this circuitry, the user can interact with processor 103, e.g., using a finger or a stylus to touch the surface of display 113 which is tactile-sensitive. Processor 103 receives from the touch screen circuitry a signal identifying the location on display 113 where it has been touched. If such a location matches the predetermined location of one of displayed options or icons, processor 103 determines that the option or icon has been selected. Otherwise, a cursor is placed at the touched location on display 113, prompting for an input from the user.

The user input may be realized using a virtual keyboard shown on display 113 also provided by the touch-screen circuitry. In a well known manner, characters are input by touching the corresponding keys on the virtual keyboard. Alternatively, processor 103 may be programmed to recognize handwritten characters, and may receive through the touch-screen circuitry images of characters drawn by the user on display 113. Any recognized characters corresponding to the drawn images then become the user input. Still alternatively, through one of external interfaces 117, arrangement 100 can be connected to a keyboard device or a personal computer (PC) having a keyboard for user input.

However, we have recognized that the traditional ways of inputting data to a hand-held device are inefficient. For example, user input by drawn images of characters is often susceptible to inaccurate character recognition by the device, thus requiring repeated input of the same characters, which is frustrating. Limited by the size of a display in a hand-held device, a virtual keyboard does not afford much room to each character key thereon. As a result, data entry using the virtual keyboard is also error prone. Inputting data to a hand-held device using a physical keyboard connected thereto is undesirable because of the bulkiness of the keyboard, which defeats the purpose of having the hand-held device for its easy transportability in the first place.

However, navigator arrangement 100 is designed pursuant to an object to minimize data entry by the user. To the extent possible, databases in arrangement 100 are pre-populated with data, which the user may edit to satisfy his/her needs. In addition, arrangement 100 allows for downloading of data from a remote source to supplement and update the databases in arrangement 100, and to provide thereto just-in-time information, including, e.g., latest traffic, weather, map and other information. To that end, transceiver 121 in communication unit 120 includes, e.g., cellular telephone circuitry for transmitting and receiving information via a wireless communications network, e.g., the well known advanced mobile phone service (AMPS) network, digital AMPS network, personal communications service (PCS) network, global system for mobile communications (GSM) network, etc. Modem 123 is used for modulating and demodulating carriers carrying the information through data channels, e.g., cellular digital packet data (CDPD) channels, in the wireless communications network.

Traditionally, a navigation device, e.g., a GPS navigation system used in an automobile, provides a user with directions to a given destination. The navigation typically provides the shortest navigated route in terms of distance to the given destination. However, we have expanded the concept of the traditional navigation to broadly include providing a navigated route subject to user preferences, together with information concerning facilities and events surrounding the navigated route for the user's convenience. The navigated route is selected to satisfy a trip's purpose. Such a trip's purpose may be (1) to reach a given destination as in prior art, and/or (2) to perform certain tasks enroute or at the destination, which may include purchasing business supplies, shopping for gifts, dining, obtaining entertainments, etc. To realize (2), navigator arrangement 100 in accordance with the invention allows for storage of user profiles including user preferences such as preferred types of restaurants, shops, entertainments, etc.

In accordance with an aspect of the invention, each user profile corresponds to one of the user's personae. For example, the user business profile corresponding to the user's business persona may be different from the user personal profile corresponding to his/her personal persona. For instance, the user business profile may include fine-dining type restaurants for business meetings while the user personal profile may instead include fast-food type restaurants for personal dining. Other profiles may include a vacation profile which corresponds to the user's vacation persona and may include a different set of preferred restaurants, shops, entertainments, etc.

In accordance with another aspect of the invention, the user can adopt a second person's profile for a certain trip's purpose, thereby temporarily assuming the second person's persona, especially when arrangement 100 is shared by more than one person. For example, where a husband and wife share the use of arrangement 100, the husband may utilize the wife's profile in arrangement 100 to shop for a gift for the wife's birthday. Based on the profile corresponding to the wife's personal persona, arrangement 100 provides a navigated route, together with information concerning the wife's personal favorite shops surrounding the route. Of course, each user's profiles may be protected against uninvited intruders. In that case, access to the profiles may require verification of a personal identification number (PIN) or password, or other well known secure access measures. Profiles may also be imported or downloaded into arrangement 100 from an external source or from another arrangement similar to arrangement 100.

Thus, in accordance with the invention, arrangement 100 provides a navigated route, together with information concerning the favorite facilities and events surrounding the navigated route, which satisfy the preferences in a selected user profile. In this instance, such information comes from an external source, e.g., a server connected to the Internet, and is communicated to arrangement 100 through communication unit 120.

In accordance with another aspect of the invention, the actual navigated route selected by arrangement 100 may depend on the mode of transportation specified by the user. For example, driving and walking are two different modes of transportation. The selected route for driving may be very different from that for walking, even though they may accomplish the same trip's purpose. The routes from which arrangement 100 selects for driving have to be passable by an automobile, which exclude, e.g., foot bridges, and walk paths through buildings, parks, fields, forests, etc. On the other hand, the routes from which arrangement 100 selects for walking have to be safe to pedestrians, which exclude, e.g., highways, freeways, etc.

In accordance with yet another aspect of the invention, the actual route selected by arrangement 100 may also depend on external conditions, e.g., traffic, weather and road conditions. Thus, based on the information concerning such external conditions received from, say, a server via the Internet, arrangement 100 selects the most time-efficient route, e.g., one that requires the least travel time, to accomplish the trip's purpose despite any adverse traffic, weather and road conditions.

In accordance with still yet another aspect of the invention, a user may prescribe one or more roadblocks specifying certain prohibited areas or paths from which the route selected by arrangement 100 deviates. For example, it may be sensible to place roadblocks around high crime areas especially when the user is new in town and unfamiliar with those areas. A roadblock may be permanent or temporary. For example, a temporary roadblock may be placed on certain streets where a parade is held which lasts for several hours. Similar to a roadblock, a blockade may be imposed to block transmission of certain information to arrangement 100 which concerns, e.g., uninteresting facilities or events.

Figure 2:
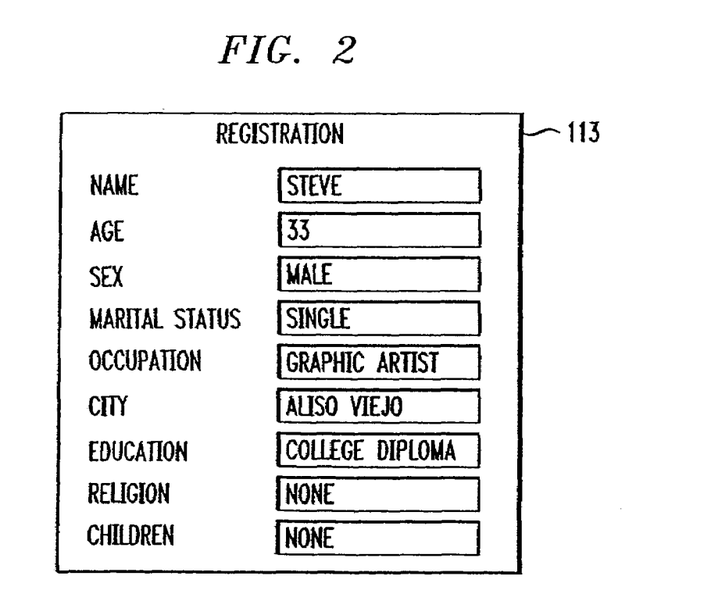
FIG. 2 illustrates a registration page shown on a display in the arrangement of FIG. 1.

When a user initially utilizes arrangement 100 for navigation in accordance with the invention, the navigator browser in arrangement 100 opens a REGISTRATION page on display 113. FIG. 2 illustrates such a REGISTRATION page where the user is prompted for entering his/her personal data, e.g., his/her name, age, sex, marital status, occupation, city, education, religion and number of children.

Figure 3:
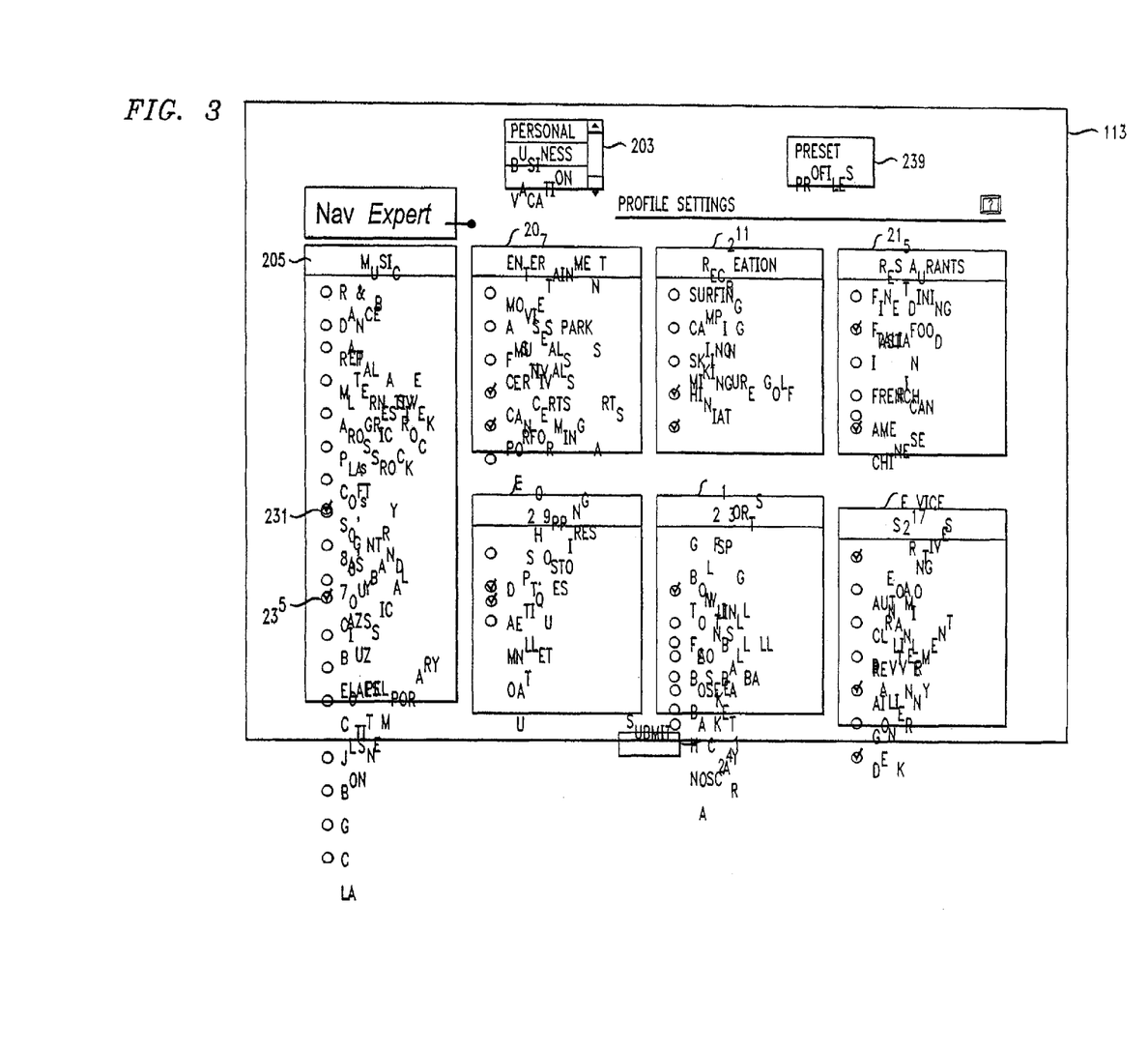
FIG. 3 illustrates a profile setting page shown on the display.

After the entry of the personal data, the navigator browser opens a PROFILE SETTING page on display 113. FIG. 3 illustrates such a PROFILE SETTING page for the user to set up a profile corresponding to one of his/her personae. The user here is afforded a choice of "business", "personal" and "vacation" personae in box 203. By way of example, the user in this instance wants to set up a "personal" profile which includes preferences of the user while on personal travel (as opposed to business travel or vacation travel). Thus, the user may use a stylus to touch the "personal" option (as opposed to the "business" or "vacation" option) in box 203 on display 113 to select the option.

In addition, the user is prompted to select preferences in different categories to be included in his/her personal profile. For example, these categories may comprise MUSIC category 205, ENTERTAINMENT category 207, SHOPPING category 209, RECREATION category 211, SPORTS category 213, RESTAURANTS category 215 and SERVICES category 217 In this instance, the user selects COUNTRY option 231, and JAZZ option 235 in MUSIC category 205 for his/her music preferences. Similarly, the user may also select any options in other categories for inclusion in his/her personal profile. Each selected option is illustratively indicated by a check mark at the option. Other profiles such as a business profile and vacation profile may be similarly set up.

Figure 4:
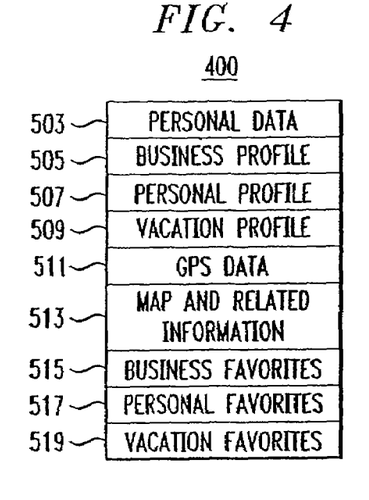
FIG. 4 illustrates the format of a user record stored in a memory of the arrangement of FIG. 1.

Continuing the above example, after setting up his/her personal profile, the user selects SUBMIT option 241. In response, processor 103 in FIG. 1 obtains from GPS receiver 119 data concerning the GPS coordinates of the current location of arrangement 100. Based on the signals from a constellation of satellites which form part of the GPS, receiver 119 in a well known manner determines the GPS coordinates in question. Processor 103 then creates a record associated with the user. FIG. 4 illustrates the format of such a record (denoted 400) created by processor 103 in memory 108. Record 400 comprises section 503 containing the aforementioned personal data including, among others, the user's name which identifies record 400. Section 505 contains any business profile set up by the user. Section 507 in this instance contains the personal profile described above. Section 509 contains any vacation profile set up by the user. Section 511 contains the aforementioned GPS data indicating the current location of arrangement 100. Section 513 contains map and related information, based on which processor 103 is capable of generating maps which correspond to different modes of transportation, e.g., by automobile, on foot or by rail. Such map and related information also includes identities of facilities and events, and the GPS coordinates identifying the locations of such facilities and events on the maps. Section 515 contains business favorites which are determined based on the personal data in section 503, business profile in section 505 and GPS data in section 511. Similarly, section 517 contains personal favorites which are determined based on the personal data in section 503, personal profile in section 507 and GPS data in section 511; and section 519 contains vacation favorites which are determined based on the personal data in section 503, vacation profile in section 509 and GPS data in section 511. It should be noted at this point that the information in sections 513, 515, 517 and 519 is provided by a navigation server connected to the Internet.

Continuing the above example, processor 103 in this instance causes the navigator browser in arrangement 100 to generate a request to the navigation server for the map and related information in section 513 and personal favorites in section 517. This request contains the personal data in section 503, personal profile in section 507, GPS data in section 511, a pre-assigned Internet protocol (IP) address for identifying the browser as the request originator, and a predetermined uniform resource locator (URL) identifying the navigation server on the Internet. It should be noted that the GPS data in section 511 is refreshed continually and in particular each time immediately before a request is sent to the navigation server to reflect the most current location of arrangement 100. The request is formatted in accordance with the requisite protocols including the well known transmission control protocol/Internet protocol (TCP/IP) in this instance.

Figure 5:
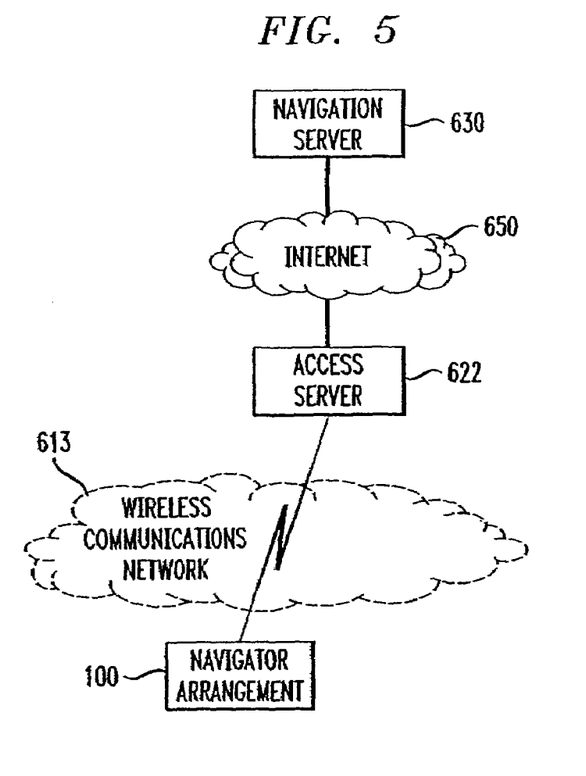
FIG. 5 illustrates a setup where the arrangement of FIG. 1 communicates with a remote server through a communications network.

Referring to FIG. 5, processor 103 causes communication unit 120 in navigator arrangement 100 to establish a dial-up connection through wireless communications network 613 to access server 622 maintained by an Internet service provider (ISP). The aforementioned request is then transmitted to access server 622 through the established connection. Upon receipt of the request, based on the URL therein, access server 622 routes the request to navigation server 630 identified by the URL. It should be noted at this point that server 622 may riot be the only access server on the Internet serving arrangement 100 and the like. It will be appreciated that more access servers similar to server 622 are geographically distributed for effective communications with arrangement 100 and the like.

Navigation server 630 which may be a host computer provides the navigation service in accordance with the invention. Among other things, server 630 receives data from different sources and maintains numerous databases therein including a map database, a weather database, a traffic database, a road-condition database, a subscriber database, a non-subscriber database, etc.

The map database provides data concerning maps covering various geographic areas. Each map includes layers corresponding to different modes of transportation. For example, a first map layer corresponds to travel by automobile; a second map layer corresponds to travel on foot; a third map layer corresponds to travel by rail; etc. The map layers can be combined to facilitate travel by more than one mode of transportation. Buildings, locations, streets, roadways and the like in the map layers are defined and identified in the database by their GPS coordinates.

The weather database contains data concerning weather conditions in various geographic areas, which is collected and updated by server 630 from time to time using such systems as the United States satellite systems, Delta radars, local area radars, etc. The data concerning the weather conditions is stored in the weather database according to the GPS coordinates defining the areas affected by the weather conditions, respectively. As such, each weather condition is readily mapped to the area defined by the corresponding GPS coordinates in the map layers.

Similarly, the traffic and road-condition databases each contain data concerning traffic and road conditions, which is updated and derived by server 630 from official traffic and road-condition reports furnished by local departments of transportation, and from data provided by well known radar systems such as line-of-sight radars, and Doppler radars each with terrain following capabilities, to sense surrounding traffic and road conditions. The data concerning the traffic conditions (road conditions) is stored in the traffic (road-condition) database according to the GPS coordinates defining the areas affected by the traffic conditions (road conditions), respectively. As such, each traffic condition (road condition) is readily mapped to the area defined by the corresponding GPS coordinates in the map layers.

The subscriber database in server 630 contains data concerning commercial facilities and events, e.g., department stores, gas stations, concerts, etc., which subscribe to the navigation service. With payment of a subscription fee, the subscribers may appear in the map layers for promotional purposes. The identities of the subscribers are stored in the subscriber database according to the GPS coordinates of the locations of such subscribers, along with other information concerning their address, contact phone number, web URL, business hours, advertisement, promotion, directory, etc.

The non-subscriber database in server 630 contains data concerning public facilities (e.g., parks, hospitals and rest stops) and civic and charity events which are selected to appear in the map layer without payment of a subscription fee. The identities of such non-subscribers are stored in the non-subscriber database according to the GPS coordinates of their locations, along with other information concerning their address, contact phone number, web URL, charity or civic functions, etc.

Continuing the above example, upon receiving the request from arrangement 100, based on the personal data, personal profile and GPS data therein, server 630 determines the user's personal favorites as requested, e.g., favorite personal facilities and events, within a limited navigation coverage, e.g., defined by a predetermined radius from the GPS coordinates identified by the GPS data Such favorite facilities and events may be selected from the above-described subscriber and non-subscriber databases. In addition, based on the map, weather, traffic, road-condition, subscriber and non-subscriber databases, server 630 provides the requested map and related information, which concerns (i) the map layers affording the limited navigation coverage, (ii) the weather, traffic and road conditions relevant to the coverage, (iii) the subscribers and non-subscribers appear in the coverage, and (iv) a time stamp indicating when the map and related information is provided. Since even with the same navigation coverage, the weather, traffic and road conditions in (ii) vary with time. As such, the map and related information is time-sensitive and thus includes the time stamp in (iv) to ensure its just-in-time provision.

Server 630 then transmits a response which contains (a) the IP address of the navigator browser in arrangement 100 to which the response is destined, (b) the personal favorite facilities and events just determined, and the GPS coordinates thereof, and (c) the map and related information, in accordance with the predetermined protocols. Upon receiving the response, processor 103 in arrangement 100 causes the received (b) and (c) to be stored in sections 517 and 513 of record 400, respectively.

Figure 6:
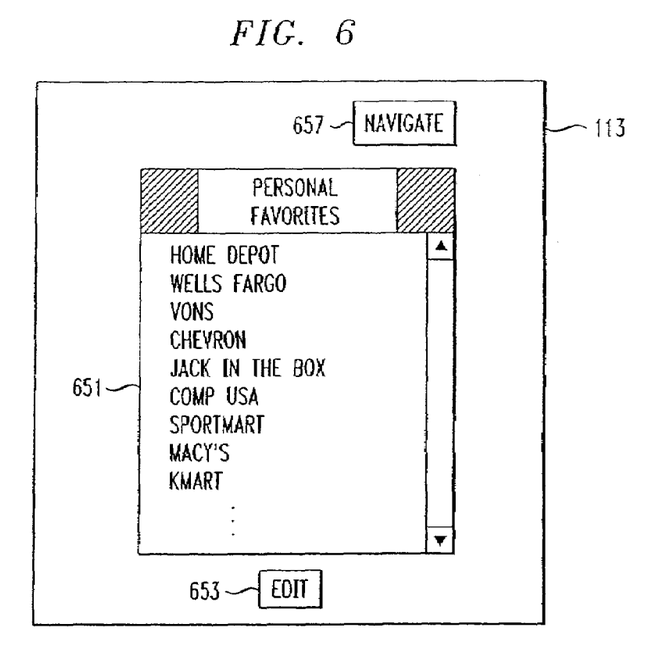
FIG. 6 illustrates a personal favorite list shown on the display.

When the content of section 517 is modified, as is in this case, the resulting list of personal favorites is automatically displayed for the user's review. FIG. 6 illustrates such a personal favorite list (denoted 651) shown on display 113 which includes, e.g., "Home Depot," "Wells Fargo," "Vons," "Chevron," "Jack in the Box," . . . .

It should be noted at this point that the personal favorites selected by server 630 may vary with the GPS data identifying the current location of arrangement 100, even though the personal data and personal profile remain the same. This stems from the fact that the selected favorite facilities and events may be limited to certain areas. When such facilities or events are outside the current navigation coverage, they are either eliminated or substituted by server 630 with similar facilities or events, in accordance with predetermined program instructions in server 630. For example, "Jack in the Box" which is a popular fast food restaurant in California but unavailable in New York may be substituted with "Wendy's" when the navigation coverage includes New York. In addition, server 630 may add to the personal favorite list those facilities and events which satisfy the personal data and personal profile, and which would otherwise be unavailable had it not been the current navigation coverage.

Advantageously, when a user travels from one navigation coverage to another, based on the same personal data and personal profile and the current personal favorite list, server 630 can "clone" personal favorite lists which correspond to different navigation coverages. Similarly, server 630 can clone business favorite lists corresponding to different navigation coverages based on the same personal data and business profile and the current business favorite list, and vacation favorite lists corresponding to different navigation coverages based on the same personal data and vacation profile and the current vacation favorite list. Thus, with arrangement 100, the user's lifestyle is maintained as much as possible despite traveling from place to place.

List 651 in FIG. 6 tends to be overinclusive. The user is afforded EDIT option 653 to modify the list to satisfy his/her needs. For example, to delete an item in list 651, the item is selected, followed by a selection of EDIT option 653. Processor 103 overwrites the content of section 517 of record 400 with the resulting list of personal favorites.

Figure 7:
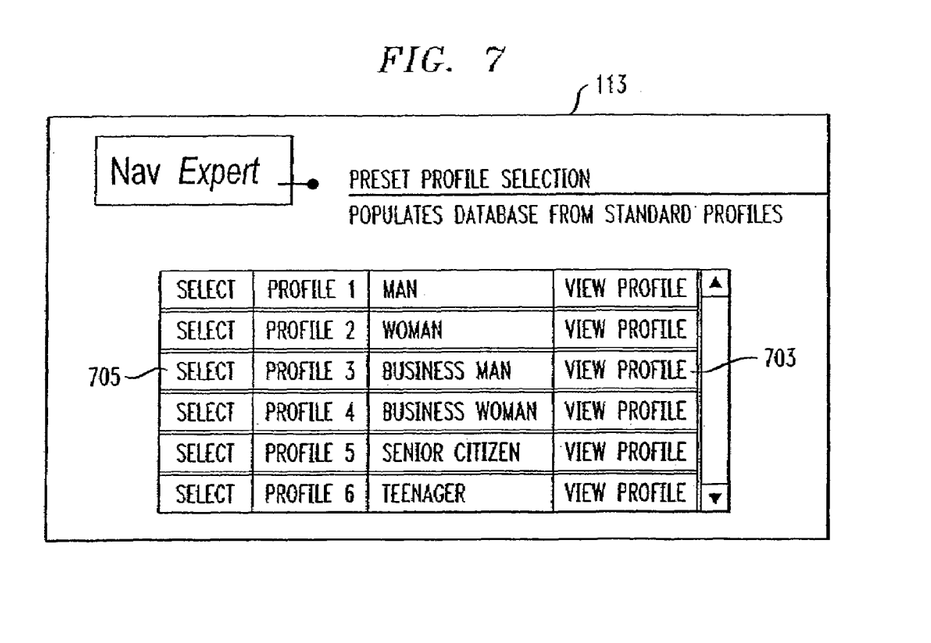
FIG. 7 illustrates preset profiles shown on the display.

As mentioned before, the user may sometimes want to adopt another person's profile for a certain trip's purpose, e.g., buying a gift for that person. Thus, the user is also afforded preset profiles in arrangement 100, from which the user may select. Such preset profiles may be accessed by selecting PRESET PROFILE option 239 on the PROFILE SETTING page of FIG. 3. FIG. 7 illustrates preset Profiles 1 through 6 corresponding to profiles of a typical "Man," "Woman," "Business Man," "Business Woman," "Senior Citizen," and "Teenager." For example, the user may be a female and want to buy a gift for a man in a business setting. In that case, the user may want to view the preferences in Profile 3 of a business man using VIEW option 703, and may select such a profile using SELECT option 705, thereby assuming a man's business persona. After such a selection, a list of favorites corresponding to Profile 3 would be downloaded from navigation server 630 for the user's review in a manner described above. The user may then get a gift idea from the favorite list, and request arrangement 100 to navigate her to a selected favorite facility to buy the gift.

It should be noted that the user may also start with one or more of preset profiles in FIG. 7, which the user may edit to become his/her business, personal and/or vacation profile described above.

Figure 8:
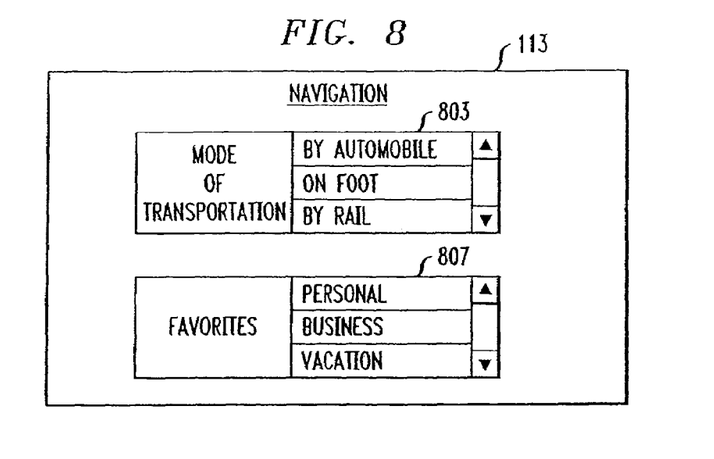
FIG. 8 illustrates a navigation page shown on the display.

Referring back to FIG. 6, after the business, personal and/or vacation favorite list is established, the user may select NAVIGATE option 657 for navigation by arrangement 100 in accordance with the invention. Upon such a selection by the user, the navigator browser in arrangement 100 opens a NAVIGATION page on display 113. FIG. 8 illustrates the NAVIGATION page where the user is prompted to select the mode of transportation (e.g., "By Automobile," "On Foot," or "By Rail" in box 803), and the list of favorites (e.g., "Personal," "Business" or "Vacation" favorites in box 807) used during the current navigation episode.

Figure 9:
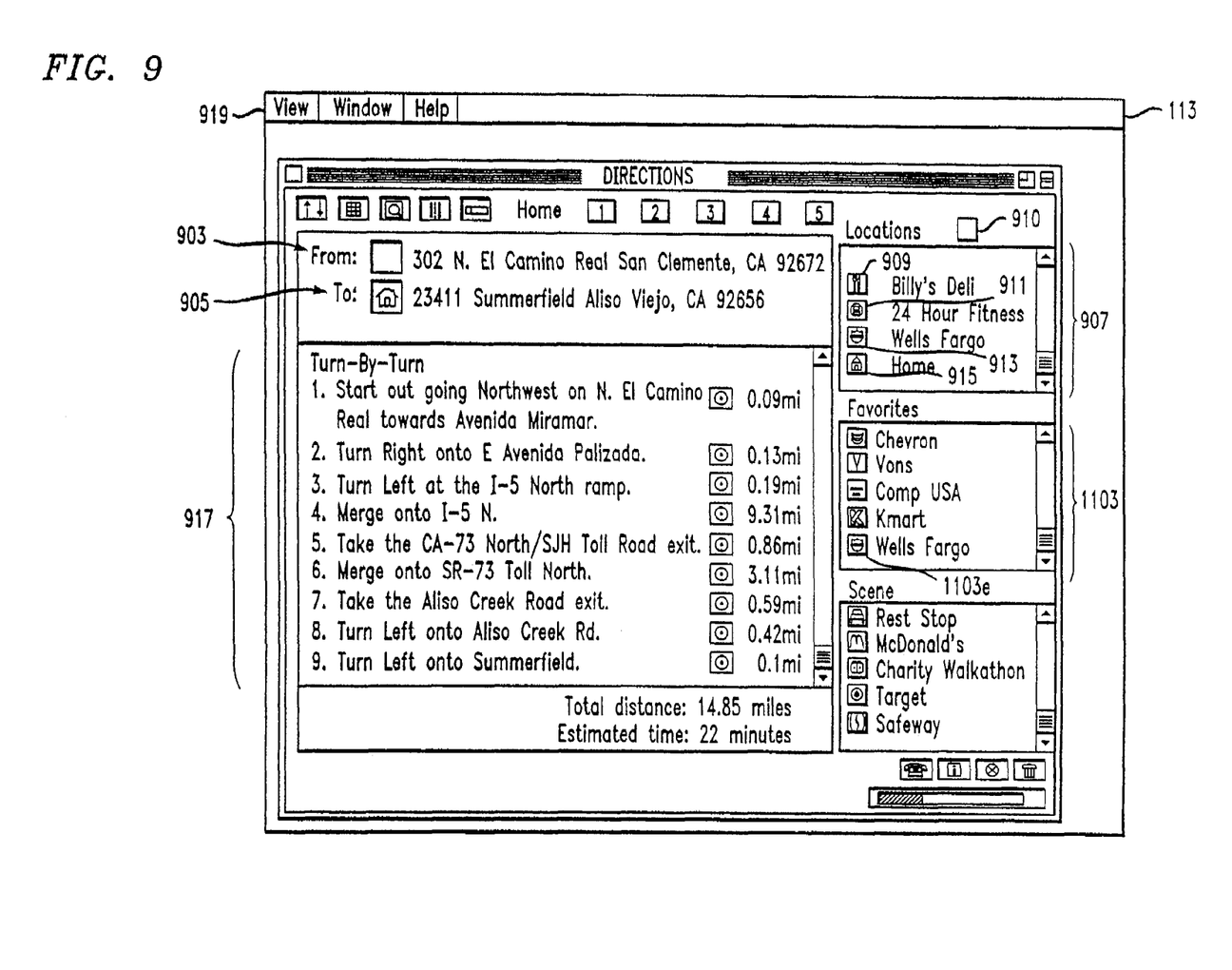
FIG. 9 illustrates a directions page shown on the display.

By way of example, the user in this instance is on a personal road trip and thus selects "By Automobile" as the mode of transportation, and "Personal" as the favorite list used. In response, the navigator browser opens a DIRECTIONS page on display 113. FIG. 9 illustrates such a DIRECTIONS page where the user is prompted to enter an origination address at query 903, where the navigation starts. In this instance, the user adopts the default response to query 903 which is the location identified by the GPS data in section 511 of record 400. Otherwise, the user may enter a different origination address. The user is also prompted to enter a destination address at query 905. The user in this instance enters a home address as the destination address. To avoid re-entering the same address in the future, the user may select LOCATIONS option 910 to save the address. In that case, the user is prompted to assign an icon, e.g., icon 915, and a designation, e.g., "HOME," to the home address. Thus, in the future, the user may select icon 915 in location box 907 to retrieve the corresponding home address in response to query 903 or 905. Similarly, in location box 907 icon 909 corresponds to a previously saved address of a delicatessen; and icon 911 corresponds to a previously saved address of a fitness center.

Alternatively, addresses in locations box 907 may be saved by clicking at icons elsewhere and duplicating same in box 907. For example, icon 913 in location box 907 corresponding to a Wells Fargo bank address results from clicking at icon 1103e in favorites box 1103 (described below with FIG. 11) and duplicating same in box 907.

After learning the origination address and destination address responsive to queries 903 and 905, respectively, processor 103 analyzes the map and related information stored in section 513 of record 400. Specifically, processor 103 determines whether the navigation coverage based on the map layer corresponding to automobile travel in this instance, includes the origination and destination addresses, and whether the stored map and related information is fresh, as indicated at step 1003 in FIG. 10. If the navigation coverage includes the origination and destination addresses in question, and the period elapsed from the time stamp of the stored map and related information does not exceed a predetermined period (i.e., the stored map and related information is fresh), based on such map and related information, processor 103 at step 1006 selects the route from the origination address to the destination address which is the most time-efficient, i.e., fastest by automobile in this instance, taking into account the relevant weather, traffic, and road conditions along the selected route, together with any roadblocks set up by the user in a manner to be described. Such a selection process is achieved by analyzing the portion of the map and related information concerning the weather, traffic and road conditions and roadblocks in the navigation coverage, and involves predictions concerning the effects of such conditions on the automobile travel along the selected route at different points in time. At step 1009, processor 103 causes turn-by-turn instructions 917 concerning the selected route to be shown on the DIRECTIONS page.

Figure 10:
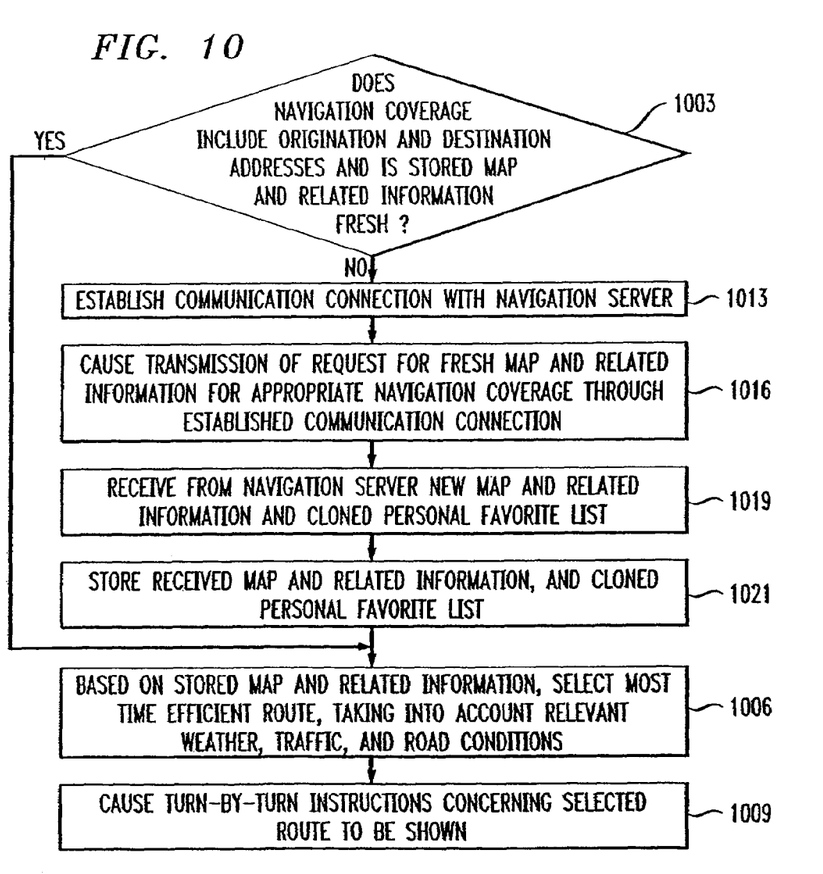
FIG. 10 is a flow chart depicting a navigation process based on certain information in the record of FIG. 4.

Otherwise, if the stored map and related information does not cover the origination and/or destination address in question, and/or if the map and related information is not fresh, processor 103 at step 1013 establishes a communication connection to navigation server 630. At step 1016, processor 103 causes a transmission of a request for fresh map and related information for an appropriate navigation coverage through the established connection. This request contains, among other things, the personal favorites in section 517, personal data in section 503 and personal profile in section 507 of record 400, in addition to the origination and destination address information. In response to such a request, navigation server 630 prepares new map and related information for the coverage from at least the origination address to the destination address. In addition, based on the new map and related information, the received personal favorite list, personal data and personal profile, server 630 "clones" a personal favorite list from the received list. As discussed before, this cloned list may be different from the received list to reflect any geographic differences between the previous and current navigation coverages. At step 1019, processor 103 receives from server 630 the new map and related information and cloned personal favorite list. Processor 103 at step 1021 stores them in sections 513 and 517 of record 400, respectively. Again, the user is afforded a chance to edit the cloned personal favorite list in a manner described before. Processor 103 then proceeds to step 1006 described above.

Referring back to FIG. 9, the user in this instance may rely on turn-by-turn instructions 917 to reach home by automobile. If arrangement 100 is "docked" or connected to the aforementioned automobile system, the turn-by-turn instructions would be communicated by the automobile system via audio media to the user when the automobile traversing the navigated route approaches each turn.

Figure 11:
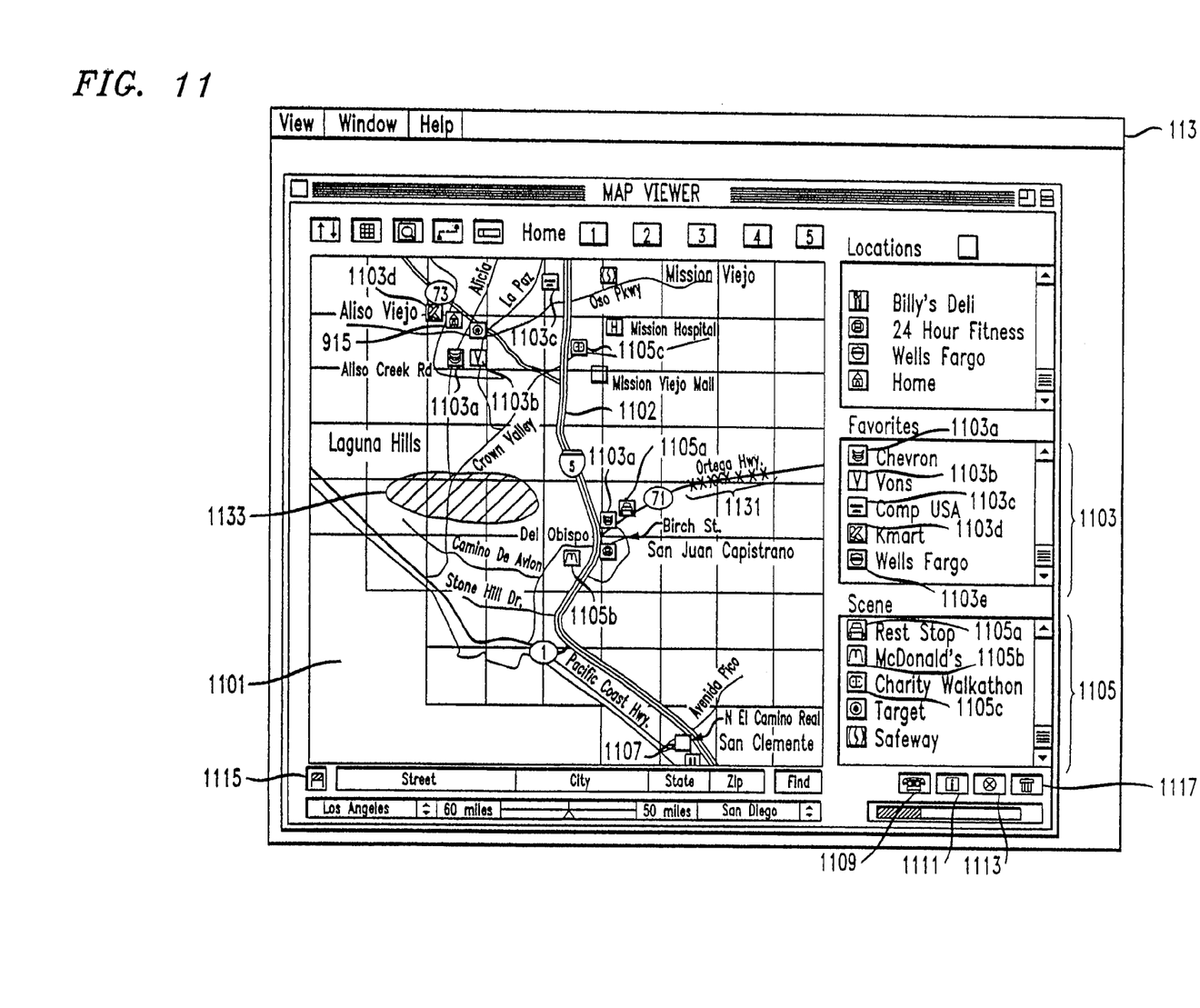
FIG. 11 illustrates a map viewer page shown on the display.

In addition, the user is afforded VIEW option 919 to view an image of a map including the navigated route. Upon selection of option 919, the navigator browser opens a MAP VIEWER page on display 113. FIG. 11 illustrates such a MAP VIEWER page including map 1101 which corresponds to automobile travel. Map 1101 is also derived from the map and related information currently stored in section 513 of record 400. The navigated route (denoted 1102) for which instructions 917 are given is highlighted on the MAP VIEWER page, with preselected icon 1107 indicating the origination address previously entered, and icon 915 described above indicating the destination address previously entered.

In addition, favorites box 1103 on the MAP VIEWER page lists the personal favorites currently stored in section 517 of record 400. The icons which are associated with such personal favorites are populated on map 1101 to indicate the locations of such personal favorites. For example, icon 1103*a* in box 1103 associated with the personal favorite "Chevron" is also shown on map 1101 to indicate its location thereon. Icon 1103*b* in box 1103 associated with "Vons" is also shown on map 1101 to indicate its location thereon. Icon 1103*c* in box 1103 associated with "Comp USA" is also shown on map 1101 to indicate its location thereon. Icon 1103*d* in box 1103 associated with "Kmart" is also shown on map 1101 to indicate its location thereon. Icon 1103*e* in box 1103 associated with "Wells Fargo" is also shown on map 1101 to indicate its location thereon.

Scene box 1105 lists "scenic" facilities and events which may serve as landmarks along the navigated route, as the icons associated with such scenic facilities and events are also populated on map 1101. Some scenic facilities and events may be important to the user such as a rest stop indicated by icon 1105*a*, or "McDonald's" indicated by icon 1105*b* in case the user is hungry when traveling along the navigated route which is not close to any of his/her favorite restaurants in this instance. Some scenic facilities and events may be of marginal interest to the user such as the "Charity Walkathon" indicated by icon 1105*c*. If indeed the user decides to adopt any scenic facility or event as one of his/her favorites, the user may use an indicator device to click at the icon associated with the scenic facility or event in either box 1105 or map 1101 and drag same into box 1103. For example, if after trying McDonald's Restaurant indicated by icon 1105*b*, the user decides to add the restaurant to his/her favorite list, he/she may then click at icon 1105*b* in either box 1105 or map 1101 and drag same into box 1103 to effect such an addition.

In this instance, the user is afforded PHONE option 1109 to contact personnel of any listed facilities or events by phone. For example, a selection by the user of icon 1105*b*, followed by a selection of telephone option 1109, causes processor 103 to look up, from the map and related information stored in section 513 of record 400, the phone number of McDonald's Restaurant associated with icon 1105*b*. Processor 103 then causes transceiver 121 to place a voice call to McDonald's Restaurant using the phone number just looked up. Accordingly, the user may talk to the personnel of the restaurant over the phone connection.

Alternatively, the user is afforded INFO option 1111 to obtain further information regarding any listed facilities or events. For example, a selection by the user of icon 1105*b*, followed by a selection of INFO option 1111, causes processor 103 to access the stored map and related information in section 513 for video and sound clips, graphics and textual information concerning McDonald's restaurant associated therewith. In this instance, the processor 103 causes user interface 115 to announce, "Welcome to McDonald's," and/or the navigator browser to play a commercial of McDonald's Restaurant based on the video and sound clips. The navigator browser then opens a MCDONALD'S RESTAURANT page on display 113.

Figure 12:
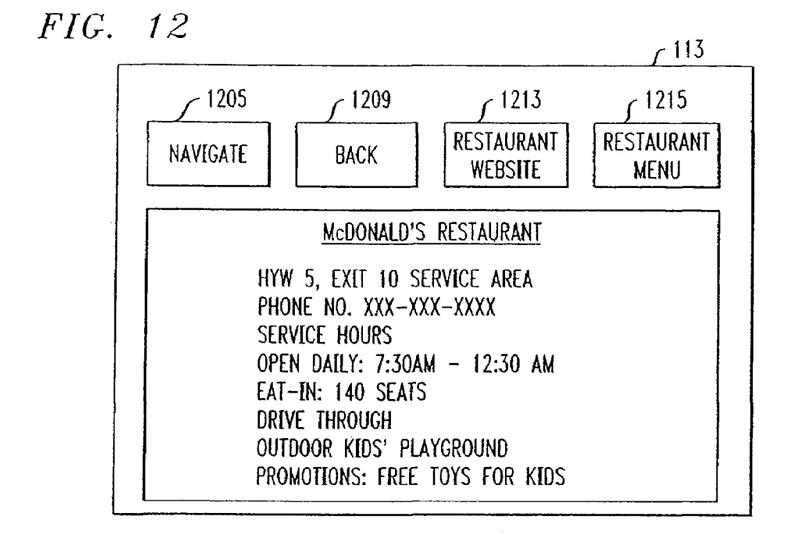
FIG. 12 illustrates a restaurant page shown on the display.

FIG. 12 illustrates the MCDONALD'S RESTAURANT page containing directions to McDonald's Restaurant associated with icon 1105*b*, and information concerning the restaurant service hours, phone number, facility, any promotion, etc. NAVIGATE key 1205, BACK key 1209, RESTAURANT WEBSITE key 1213 and RESTAURANT MENU key 1215 are also provided on the RESTAURANT page. A selection of NAVIGATE key 1205 causes processor 103 to provide the user with a DIRECTIONS page similar to FIG. 9 described before, including turn-by-turn instructions to the restaurant.

A selection of BACK key 1209 enables the user to return to the previous page, i.e., the MAP VIEWER page. Key 1213 represents a hyperlink to the website of the restaurant. Thus, a selection of key 1213 causes the navigator browser to open the restaurant home page on display 113. In addition, a selection of key 1215 enables the user to access the RESTAURANT MENU page, which is illustrated in FIG. 13.

Figure 13:
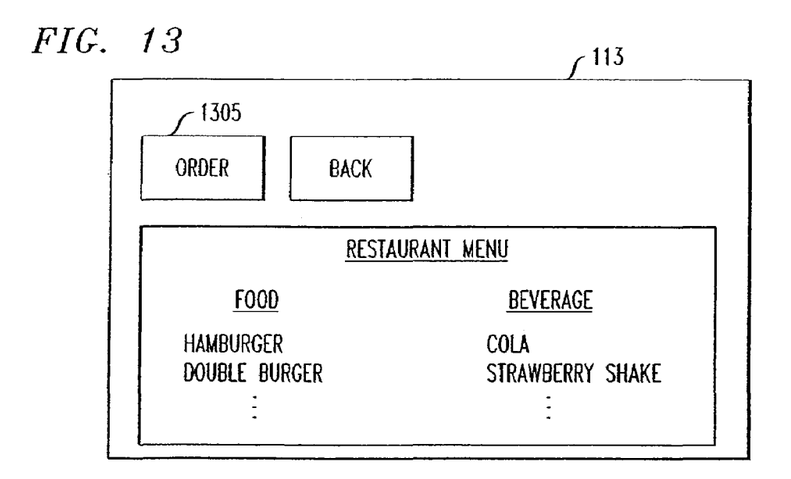
FIG. 13 illustrates a restaurant menu page shown on the display.

As shown in FIG. 13, the RESTAURANT MENU page enumerates types of food and beverages-served in the restaurant. Each food and beverage entry may be highlighted by selecting same. The user may order ahead the highlighted food and beverages by selecting ORDER key 1305. Upon selection of key 1305, the navigator browser causes the order information to be transmitted through Internet 650 to a restaurant server at a predetermined URL for processing the order. Thus, the resulting order awaits the user's arrival at the restaurant.

Referring back to FIG. 11, the user is also afforded BLOCK option 1113, whereby the user can prevent or limit the appearance of certain subscribers and non-subscribers in navigation by arrangement 100. For example, a selection by the user of icon 1105*b*, followed by a selection of BLOCK option 1113, causes the navigator browser to send to server 630 a request for blocking transmission of information concerning McDonald's Restaurant to arrangement 100. Upon receiving such a request, server 630 returns to the navigator browser an INQUIRY page, which the browser then opens on display 113.

Figure 14:
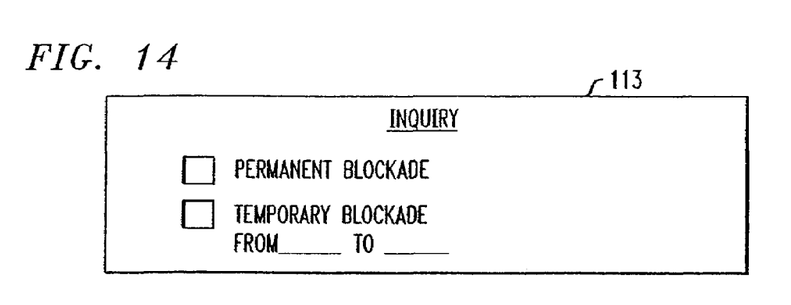
FIG. 14 illustrates an inquiry page where a user is presented a choice of blockades in accordance with the invention.

FIG. 14 illustrates such an INQUIRY page where the user is afforded a choice of a PERMANENT BLOCKADE and a TEMPORARY BLOCKADE. In this instance, a selection by the user of the PERMANENT BLOCKADE causes a permanent prevention of transmission of information concerning any McDonald's Restaurant in the world to arrangement 100. An alternative selection of the TEMPORARY BLOCKADE needs to be accompanied by a specification of a time period during which the blockade is effective. For example, the user may have grown tired of McDonald's food and thus may want to use the TEMPORARY BLOCKADE to prevent transmission of information concerning any McDonald's Restaurant in the world to arrangement 100 for a specified period.

Any blockade choice by the user is communicated by the navigator browser in arrangement 100 to server 630. The latter stores the blockade choice in a record identified by the IP address of the navigator browser. In each subsequent navigation episode, server 630 transmits to the navigator browser information concerning subscribers and non-subscribers in a selective manner, reflecting any blockade choice stored in the associated record.

Similarly, the user is afforded ROADBLOCK option 1115 to preclude certain roadways or areas from navigation consideration by arrangement 100 as the roadways may be hazardous for driving and the areas may have a high crime rate. For example, to set up roadblocks, after selecting ROADBLOCK option 1115, the user may use a stylus to trace any roadway or define any area on display 113 to be excluded from the navigation consideration. In this instance, the user chooses to block a portion of the Ortega Highway denoted 1131 and indicated by crosses thereon, and area 1133 shown shaded in FIG. 11. In response, the navigator browser may open an inquiry page similar to FIG. 14 where the user may specify whether each roadblock is a permanent blockade or temporary blockade. Processor 103 stores the user's choices of blockade and the GPS coordinates defining road portion 1131 and area 1133 in section 513 of record 400. Based on such stored information, processor 103 accordingly selects routes circumventing road portion 1131 and area 1133 in navigation.

The user is also afforded DELETE option 1117 to remove certain displayed items in the MAP VIEWER page. For example, a selection by the user of icon 1105*b*, followed by a selection of DELETE option 1117 causes a deletion of icon 1105*b* from both box 1105 and map 1101, along with any information associated therewith.

The foregoing merely illustrates the principles of the invention It will thus be appreciated that those skilled in the art will be able to devise numerous other arrangements which embody the principles of the invention and are thus within its spirit and scope.

For example, navigator arrangement 100 is disclosed herein in a form in which various functions are performed by discrete functional blocks. However, any one or more of these functions could equally well be embodied in an arrangement in which the functions of any one or more of those blocks or indeed, all of the functions thereof, are realized, for example, by one or more appropriately programmed processors.

The invention claimed is:

1. A method for navigation using a navigation device which includes a location-sensing element therein, the method comprising:
   forming a database storing traffic information for extraction thereof with respect to areas;
   receiving data concerning a location of the navigation device which is determined using the location-sensing element;
   searching the database for traffic information specific to a coverage area including the location of the navigation device;
   receiving a request for planning a route from an origination to a destination;
   determining that the coverage area is different from one or more areas in navigation coverage defined at least by the origination and the destination;
   searching the database for selected traffic information specific to the one or more areas; and
   planning a route to the destination, taking into consideration at least traffic conditions derived from the selected traffic information.

2. The method of claim 1 wherein the database is external to the navigation device.

3. The method of claim 1 wherein the location of the navigation device is defined by GPS coordinates.

4. The method of claim 1 wherein the navigation device is used in a vehicle.

5. The method of claim 1 wherein road conditions are also taken into consideration in planning the route.

6. The method of claim 1 wherein weather conditions are also taken into consideration in planning the route.

7. The method of claim 1 wherein the navigation device includes a display element, and at least part of the planned route is shown on the display element.

8. The method of claim 1 wherein turn-by-turn instructions are communicated via audio media to a user of the navigation device when traversing the planned route.

9. A method for navigation using a navigation device which includes a location-sensing element therein, the method comprising:
   forming a database storing weather information for extraction thereof with respect to areas;
   receiving data concerning a location of the navigation device which is determined using the location-sensing element;
   searching the database for weather information specific to a coverage area including the location of the navigation device;
   receiving a request for planning a route from an origination to a destination;
   determining that the coverage area is different from one or more areas in navigation coverage defined at least by the origination and the destination;
   searching the database for selected weather information specific to the one or more areas; and
   planning a route to the destination, taking into consideration at least weather conditions derived from the selected weather information.

10. The method of claim 9 wherein the database is external to the navigation device.

11. The method of claim 9 wherein the location of the navigation device is defined by GPS coordinates.

12. The method of claim 9 wherein the navigation device is used in a vehicle.

13. The method of claim 9 wherein road conditions are also taken into consideration in planning the route.

14. The method of claim 9 wherein traffic conditions are also taken into consideration in planning the route.

15. The method of claim 9 wherein the navigation device includes a display element, and at least part of the planned route is shown on the display element.

16. The method of claim 9 wherein turn-by-turn instructions are communicated via audio media to a user of the navigation device when traversing the planned route.

17. A navigation system for a user traveling in a vehicle, comprising:
   a database formed to store traffic information for extraction thereof with respect to areas;

a processing unit for searching the database for traffic information specific to a coverage area including the location of the vehicle; and an interface for receiving a request for planning a route from an origination to a destination, wherein when it is determined that the coverage area is different from one or more areas in navigation coverage defined at least by the origination and the destination, the processing unit searches the database for selected traffic information specific to the one or more areas, and wherein a route to the destination is planned, taking into consideration at least traffic conditions derived from the selected traffic information.

18. The system of claim 17 wherein the location of the vehicle is defined by GPS coordinates.

19. The system of claim 17 wherein road conditions are also taken into consideration in planning the route.

20. The system of claim 17 wherein weather conditions are also taken into consideration in planning the route.

21. The system of claim 17 wherein at least part of the planned route is shown on a display.

22. The system of claim 17 wherein turn-by-turn instructions are communicated via audio media to the user.

23. The system of claim 17 wherein the database is external to the vehicle.

24. A navigation system for a user traveling in a vehicle, comprising:

a database formed to store weather information for extraction thereof with respect to areas;

a processing unit for searching the database for weather information specific to a coverage area including the location of the vehicle; and an interface for receiving a request for planning a route from an origination to a destination, wherein when it is determined that the coverage area is different from one or more areas in navigation coverage defined at least by the origination and the destination, the processing unit searches the database for selected weather information specific to the one or more areas, and wherein a route to the destination is planned, taking into consideration at least traffic conditions derived from the selected weather information.

25. The system of claim 24 wherein the location of the vehicle is defined by GPS coordinates.

26. The system of claim 24 wherein road conditions are also taken into consideration in planning the route.

27. The system of claim 24 wherein traffic conditions are also taken into consideration in planning the route.

28. The system of claim 24 wherein at least part of the planned route is shown on a display.

29. The system of claim 24 wherein turn-by-turn instructions are communicated via audio media to the user.

30. The system of claim 24 wherein the database is external to the vehicle.

* * * * *